US012607311B1

(12) United States Patent
Ouyang

(10) Patent No.: US 12,607,311 B1
(45) Date of Patent: Apr. 21, 2026

(54) MODULAR FLOOR LAMP

(71) Applicant: Xiaoling Ouyang, Dongguan City (CN)

(72) Inventor: Xiaoling Ouyang, Dongguan City (CN)

( * ) Notice: Subject to any disclaimer, the term of this patent is extended or adjusted under 35 U.S.C. 154(b) by 0 days.

(21) Appl. No.: 19/346,443

(22) Filed: Sep. 30, 2025

(30) Foreign Application Priority Data

Dec. 9, 2024 (CN) ........................ 202423030989.9

(51) Int. Cl.
*F21S 2/00* (2016.01)
*F21S 4/26* (2016.01)
*F21S 6/00* (2006.01)

(52) U.S. Cl.
CPC ................ *F21S 2/005* (2013.01); *F21S 4/26* (2016.01); *F21S 6/004* (2013.01)

(58) Field of Classification Search
CPC .... F21S 2/005; F21S 4/26; F21S 6/004; F21S 6/00; F21S 6/005; F21S 6/008; F21V 5/04; F21V 21/06; F21V 23/004
See application file for complete search history.

(56) References Cited

U.S. PATENT DOCUMENTS

| | | | | |
|---|---|---|---|---|
| 6,361,186 | B1 * | 3/2002 | Slayden | F21V 3/0625 362/240 |
| 6,736,525 | B2 * | 5/2004 | Chin | F21S 4/20 250/559.19 |
| 7,213,941 | B2 * | 5/2007 | Sloan | F21V 21/005 362/240 |
| 8,366,291 | B2 * | 2/2013 | Hoffmann | F21S 8/022 362/225 |
| 10,344,925 | B2 * | 7/2019 | Siltanen | F21S 4/28 |
| 2022/0221131 | A1 * | 7/2022 | Shapiro | F21S 10/00 |

* cited by examiner

*Primary Examiner* — Bao Q Truong

(57) ABSTRACT

The present invention provides a modular floor lamp, which includes a supporting member and a flexible light-emitting device detachably connected to the supporting member. The flexible light-emitting device includes a light-transmitting lamp body and a light-emitting element; the lamp body is provided with at least one installation cavity, and the light-emitting element is arranged within the installation cavity in a detachable manner; the lamp body is also provided with at least one cavity, the cavity is arranged parallel to the installation cavity, and a light from the light-emitting element enters the cavity and is refracted and mixed within the cavity.

19 Claims, 10 Drawing Sheets

MODULAR FLOOR LAMP

CROSS-REFERENCE TO RELATED APPLICATIONS

The present invention claims priority of Chinese patent application CN2024230309899, filed on Dec. 9, 2024, which is incorporated herein by reference in its entireties.

TECHNICAL FIELD

The present invention relates to the field of light fixtures, particularly a modular floor lamp.

BACKGROUND

In modern lighting design, floor lamps are widely popular due to their flexible design and versatility. Traditional floor lamps usually adopt a fixed structure. Although they can provide basic lighting functions, there are certain limitations in adjusting the light direction and light distribution. Meanwhile, the disassembly, assembly, and maintenance processes of traditional floor lamps are relatively cumbersome, and users often need to spend a lot of time and effort when replacing bulbs or performing repairs.

To overcome the above drawbacks, the design of modular floor lamps has emerged. The modular floor lamp, through modular design, enables each component of the lamp to be easily disassembled and assembled. However, most of the modular floor lamps currently on the market have uneven light distribution and are unable to provide a soft lighting effect.

Therefore, the present invention provides a brand-new modular floor lamp. The floor lamp has a more uniform and soft lighting effect, reduces light spots and shadows, and improves the light quality and visual comfort.

SUMMARY

In order to overcome the shortcomings of the prior art, the present invention provides a modular floor lamp. The floor lamp has a more uniform and soft lighting effect, reduces light spots and shadows, and improves the light quality and visual comfort.

The technical solution adopted by the present invention to solve the technical problem is as follows.

The present invention provides a modular floor lamp, which includes a supporting member and a flexible light-emitting device detachably connected to the supporting member. The flexible light-emitting device includes a light-transmitting lamp body and a light-emitting element; the lamp body is provided with at least one installation cavity, and the light-emitting element is arranged within the installation cavity in a detachable manner; the lamp body is also provided with at least one cavity, the cavity is arranged parallel to the installation cavity, and a light from the light-emitting element enters the cavity and is refracted and mixed within the cavity.

As an improvement of the present invention, the supporting member includes at least one first supporting member and at least one second supporting member, the first supporting member and the second supporting member are detachably connected through a first insertion column.

As an improvement of the present invention, both the first supporting member and the second supporting member have a hollow cylindrical structure, the first supporting member and the second supporting member are equipped with a first partition plate respectively, the first partition plate divides an internal space of the first supporting member and the second supporting member into a first accommodating space and a second accommodating space respectively, the lamp body is installed within the first accommodating space in a detachable manner, and an outer side wall of the lamp body abuts against an inner side wall of the first accommodating space.

As an improvement of the present invention, each of two ends of the second accommodating space is provided with a first insertion hole, and the first insertion column is inserted into the first insertion hole, thus the first supporting member and the second supporting member are detachably connected.

As an improvement of the present invention, each of two ends of the first partition plate is provided with at least one fixing hole respectively, a fastener is arranged within the fixing hole, and when the first insertion column is inserted into the first insertion hole, the fastener abuts against the first insertion column, thus the first insertion column is fixed within the first insertion hole.

As an improvement of the present invention, one side of the first partition plate facing the second accommodating space is provided with a first groove and a second groove, one side of the first insertion column is provided with a first raised strip and a second raised strip, when the first insertion column of the first supporting member is inserted into the first insertion hole of the second supporting member, the first raised strip is clamped into the first groove, and the second raised strip is clamped into the second groove.

As an improvement of the present invention, the first supporting member and the second supporting member are respectively provided with an installation opening, and the installation opening is communicated with the first accommodating space, thus the lamp body is installed within the first accommodating space in a detachable manner through the installation opening.

As an improvement of the present invention, each of two side walls of the first accommodating space is provided with an installation clamping strip respectively, each of two side walls of the lamp body is provided with an installation clamping groove corresponding to the installation clamping strip, and the installation clamping strip is clamped into the installation clamping groove, thus the lamp body is detachably connected with the first accommodating space.

As an improvement of the present invention, the lamp body is a flexible light-transmitting hose, the light-emitting element includes a flexible light panel and a plurality of light beads electrically connected to the flexible light panel, and the light-emitting element is able to be bent at any angle along with the lamp body.

As an improvement of the present invention, each of two ends of the lamp body is provided with an opening respectively, and the opening is communicated with the cavity, thus the light-emitting element is installed within the installation cavity in a detachable manner through the opening.

As an improvement of the present invention, each of two ends of the lamp body is provided with a first sealing cover and a second sealing cover respectively for sealing the opening, the first sealing cover is provided with a through hole, and the through hole is communicated with the installation cavity, thus the light-emitting element is installed within the installation cavity in a detachable manner and extends outward from the through hole to be electrically connected with an external power source.

As an improvement of the present invention, the first sealing cover and the second sealing cover are respectively provided with a sealing column, and the sealing column is installed within the cavity to seal the cavity.

As an improvement of the present invention, the cavity is positioned on an outer side of the installation cavity, and an outer side wall of the cavity has an arc-shaped structure, thus a light of the light-emitting element is refracted and mixed within the cavity and then diverges outward.

As an improvement of the present invention, a thickness of an outer side wall of the installation cavity ranges from 0.1 mm to 100 mm, a thickness of the outer side wall of the cavity ranges from 0.2 mm to 120 mm, and an accommodating space volume of the cavity is greater than an accommodating space volume of the installation cavity, thus the light is able to be fully refracted and mixed within the cavity.

As an improvement of the present invention, the floor lamp also includes a base, the base is detachably connected with the supporting member, and the flexible light-emitting device is detachably connected to the supporting member and is electrically communicated with the base.

As an improvement of the present invention, the base includes an installation bottom plate, a central connecting column is arranged on the installation bottom plate, and the central connecting column is detachably connected with the supporting member through a second insertion column.

As an improvement of the present invention, each of two ends of the supporting member is provided with a second insertion hole, and the second insertion column is inserted into the second insertion hole respectively, thus the base and the supporting member are detachably connected.

As an improvement of the present invention, the central connecting column has a hollow cylindrical structure, a second partition plate is arranged within the central connecting column, the second partition plate divides an internal space of the central connecting column into a third accommodating space and a fourth accommodating space respectively, and the second insertion column abuts against an inner side wall of the third accommodating space.

As an improvement of the present invention, the light-emitting element is installed within the supporting member in a detachable manner and extends toward an interior of the fourth accommodating space, and electrically connected with the base.

As an improvement of the present invention, a cover plate for sealing the supporting member is arranged on a top end of the supporting member.

Beneficial effects: The present invention discloses a modular floor lamp, including a supporting member and a flexible light-emitting device detachably connected to the supporting member. The flexible light-emitting device includes a light-transmitting lamp body and a light-emitting element. The lamp body is provided with at least one installation cavity, and the light-emitting element is arranged within the installation cavity in a detachable manner. The lamp body is also provided with at least one cavity, the cavity is arranged parallel to the installation cavity, and the light of the light-emitting element is refracted and mixed through the cavity, providing a more uniform and soft lighting effect, which can effectively reduce light spots and shadows, improving the quality of the light and visual comfort.

BRIEF DESCRIPTION OF THE DRAWINGS

In order to explain the technical solutions of the embodiments of the present invention more clearly, the following will briefly introduce the accompanying drawings used in the embodiments. The drawings in the following description are only some embodiments of the present invention. Those of ordinary skill in the art can obtain other drawings based on these drawings without creative work.

The present invention is further described below in detail in combination with the accompanying drawings and embodiments.

DETAILED DESCRIPTION OF THE EMBODIMENTS

Figure 1:
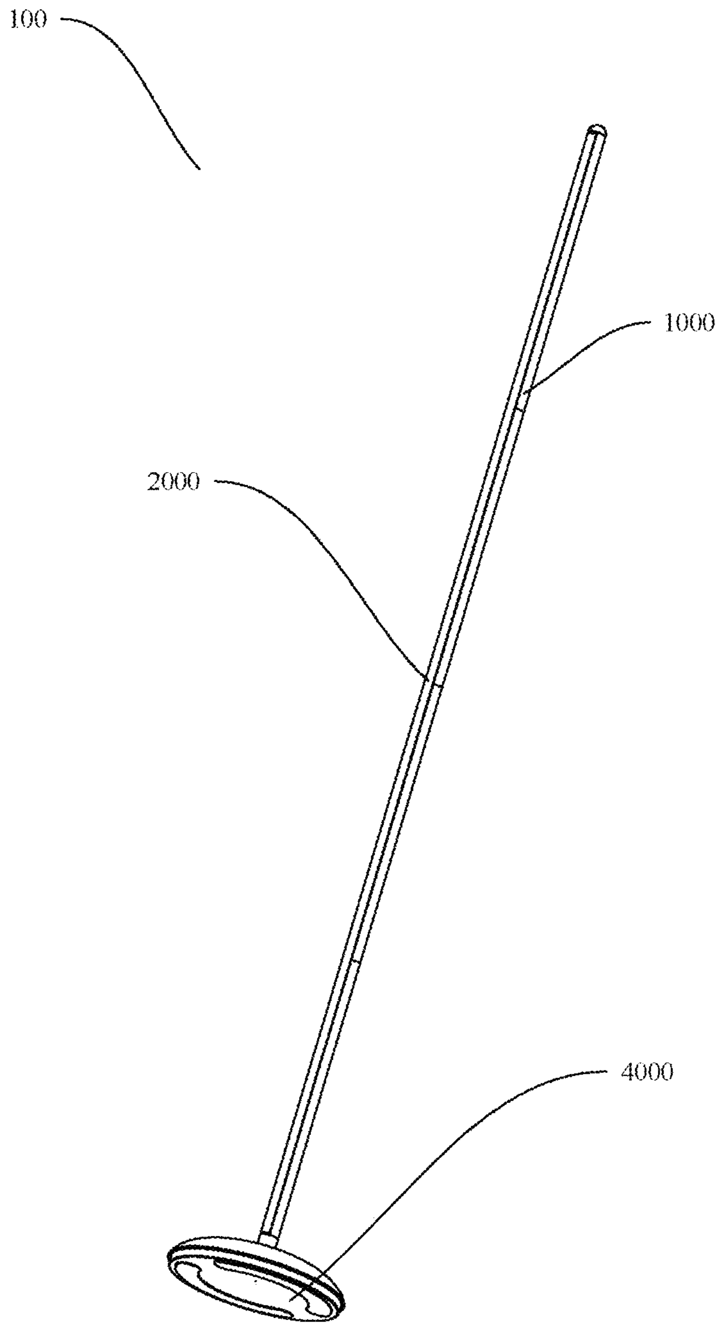
FIG. 1 is a schematic diagram of an overall structure of the present invention.
Figure 2:
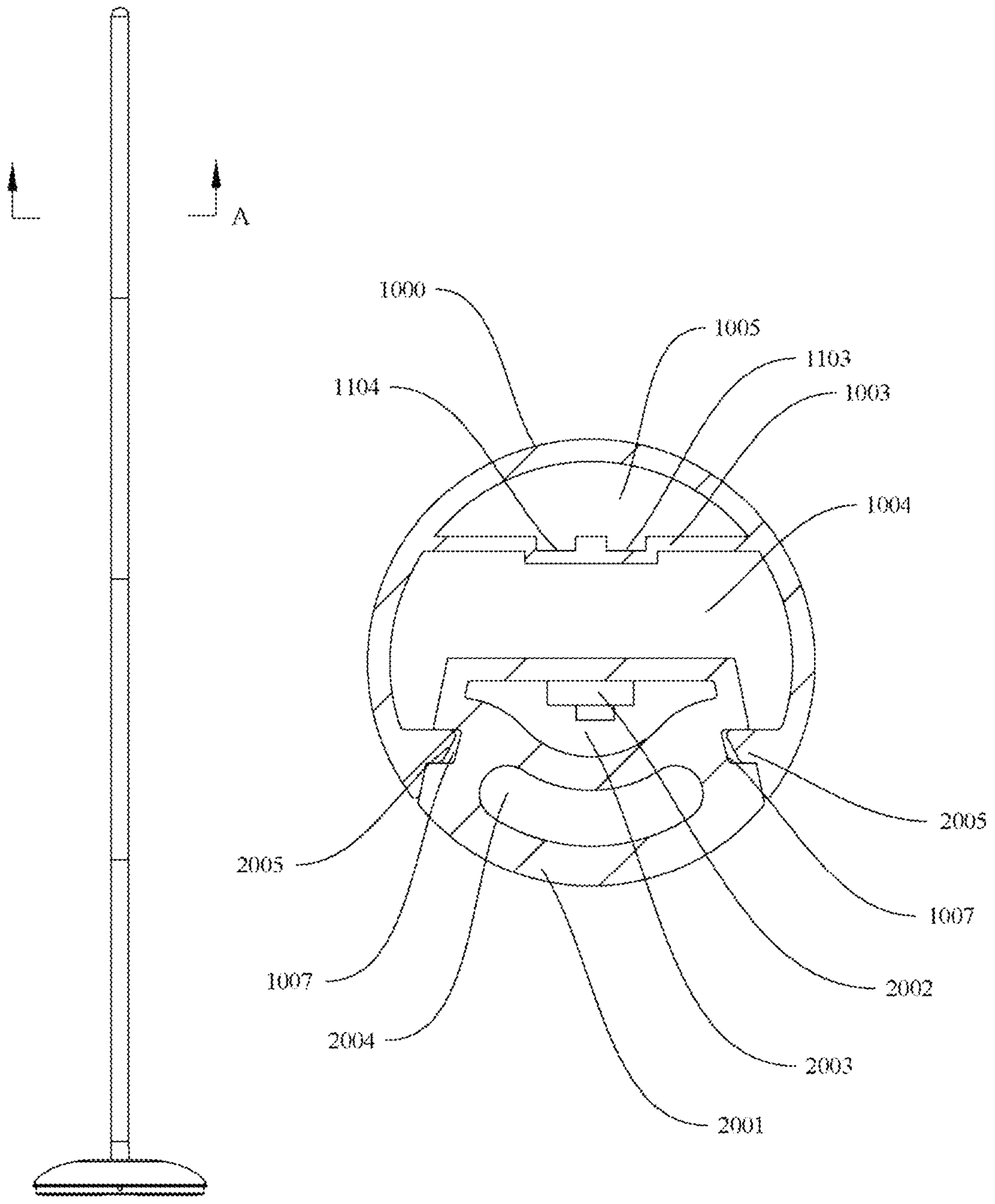
FIG. 2 is a schematic cross-sectional structure diagram of an area A of the present invention.
Figure 3:
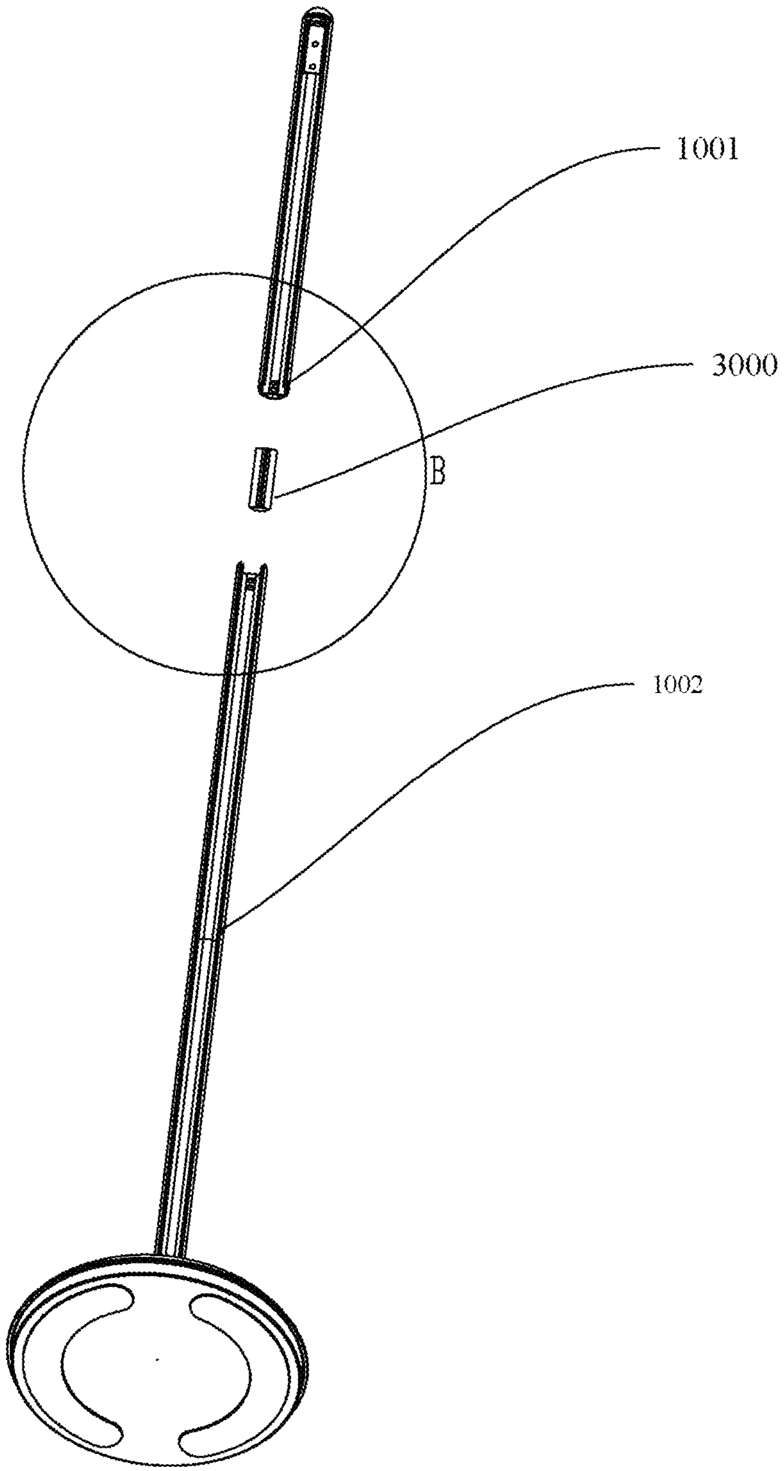
FIG. 3 is an exploded structural schematic diagram of a connection of a first supporting member and a second supporting member.
Figure 4:
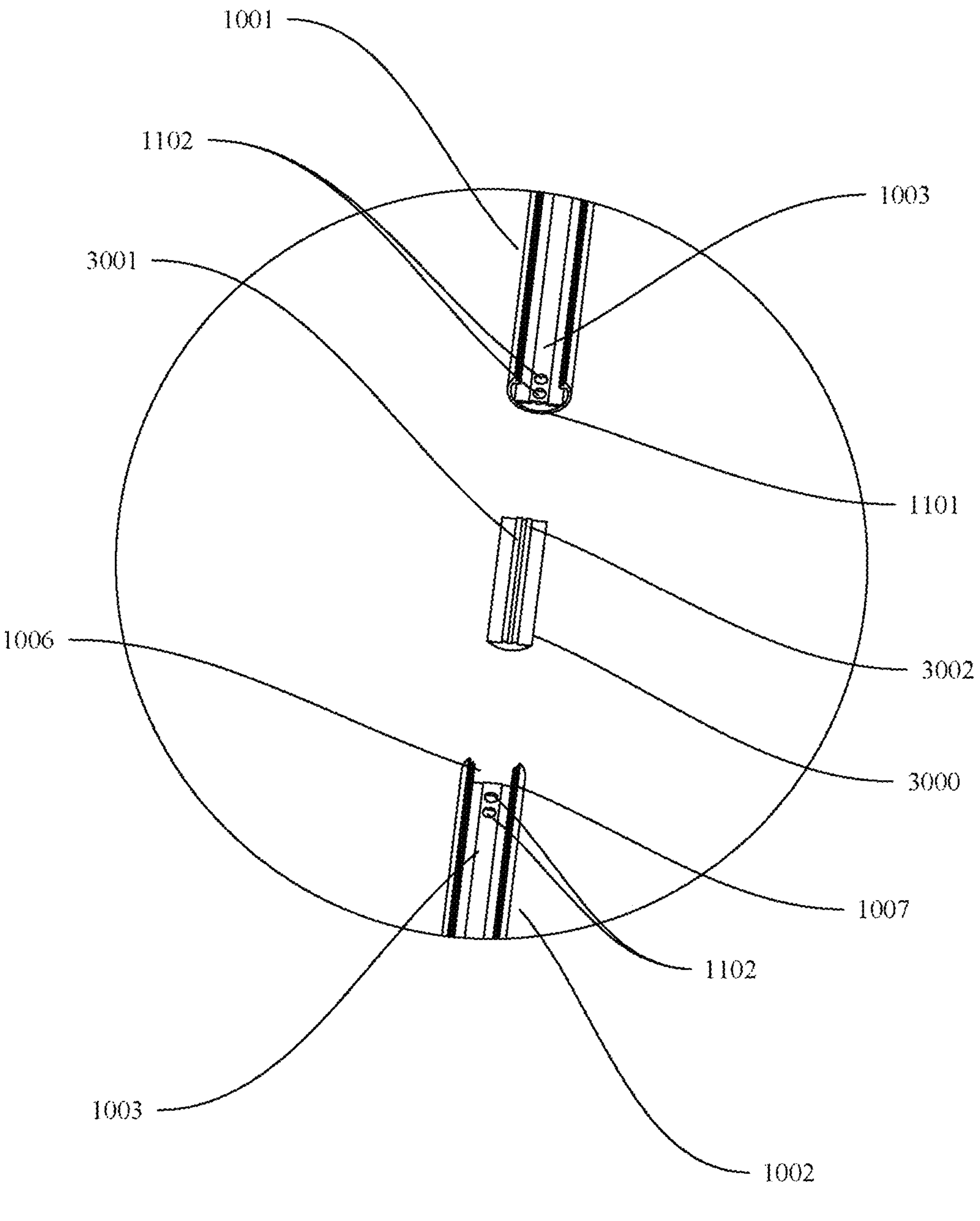
FIG. 4 is an enlarged structural diagram of an area B in FIG. 3.
Figure 5:
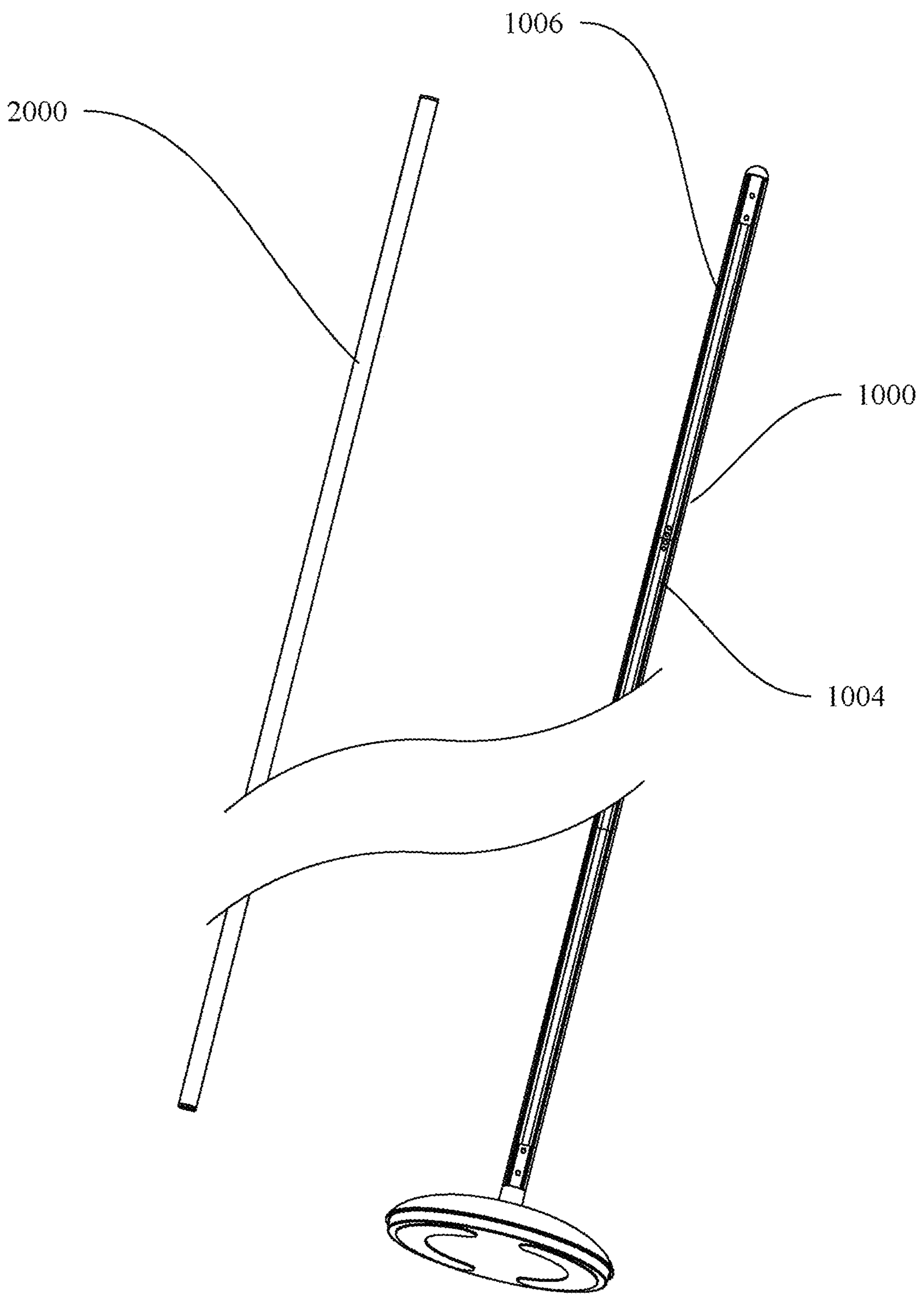
FIG. 5 is an exploded structural schematic diagram of a connection of a flexible light-emitting device and a supporting member.
Figure 6:
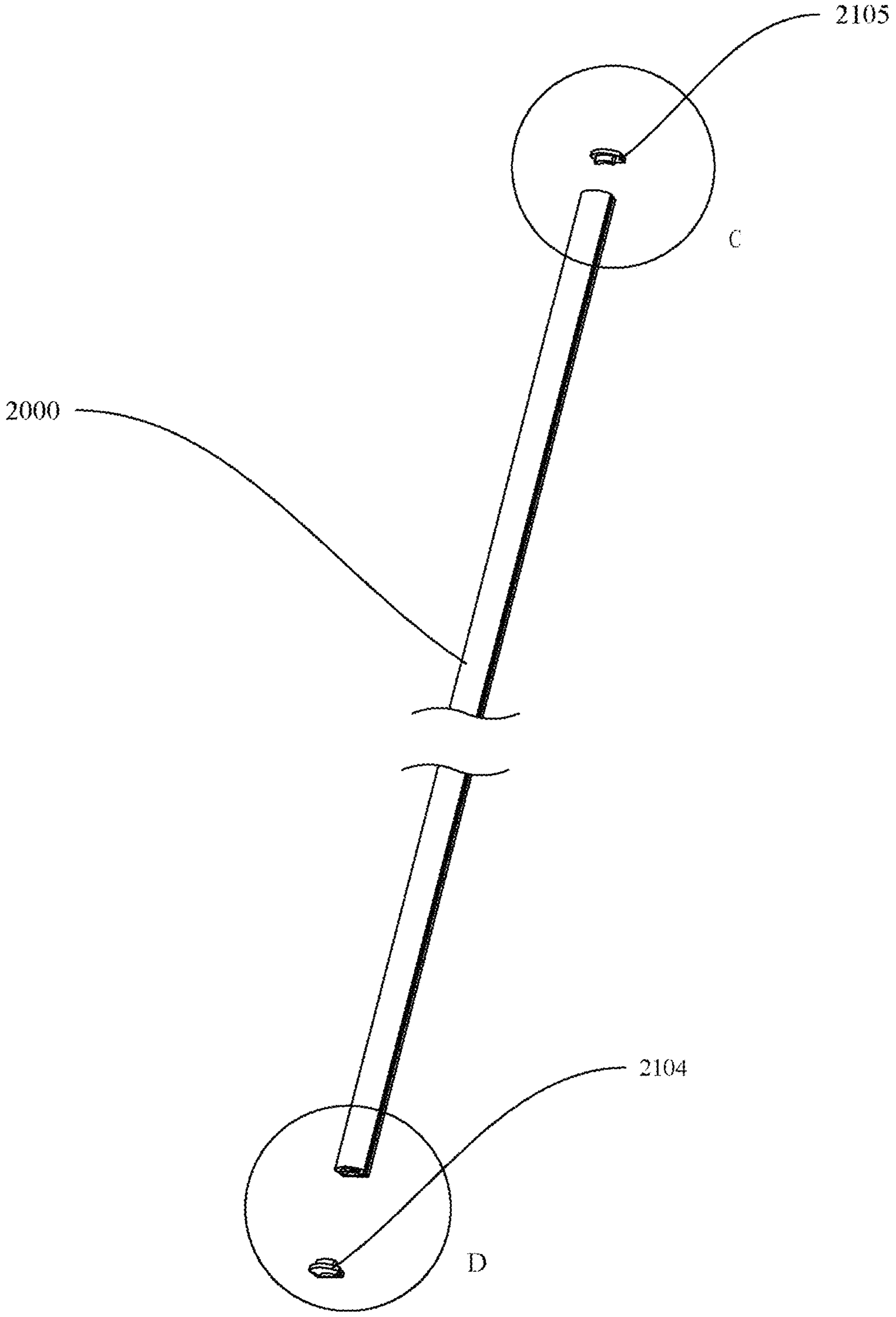
FIG. 6 is a schematic structural diagram of the flexible light-emitting device.
Figure 7:
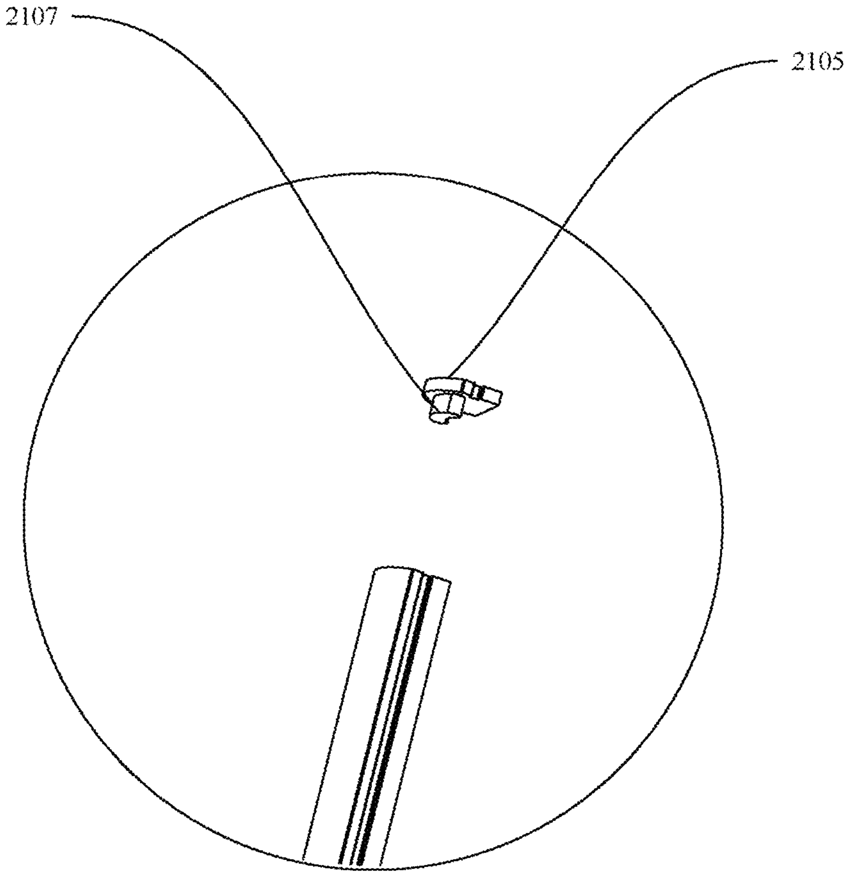
FIG. 7 is an enlarged structural diagram of an area C in FIG. 6.
Figure 8:
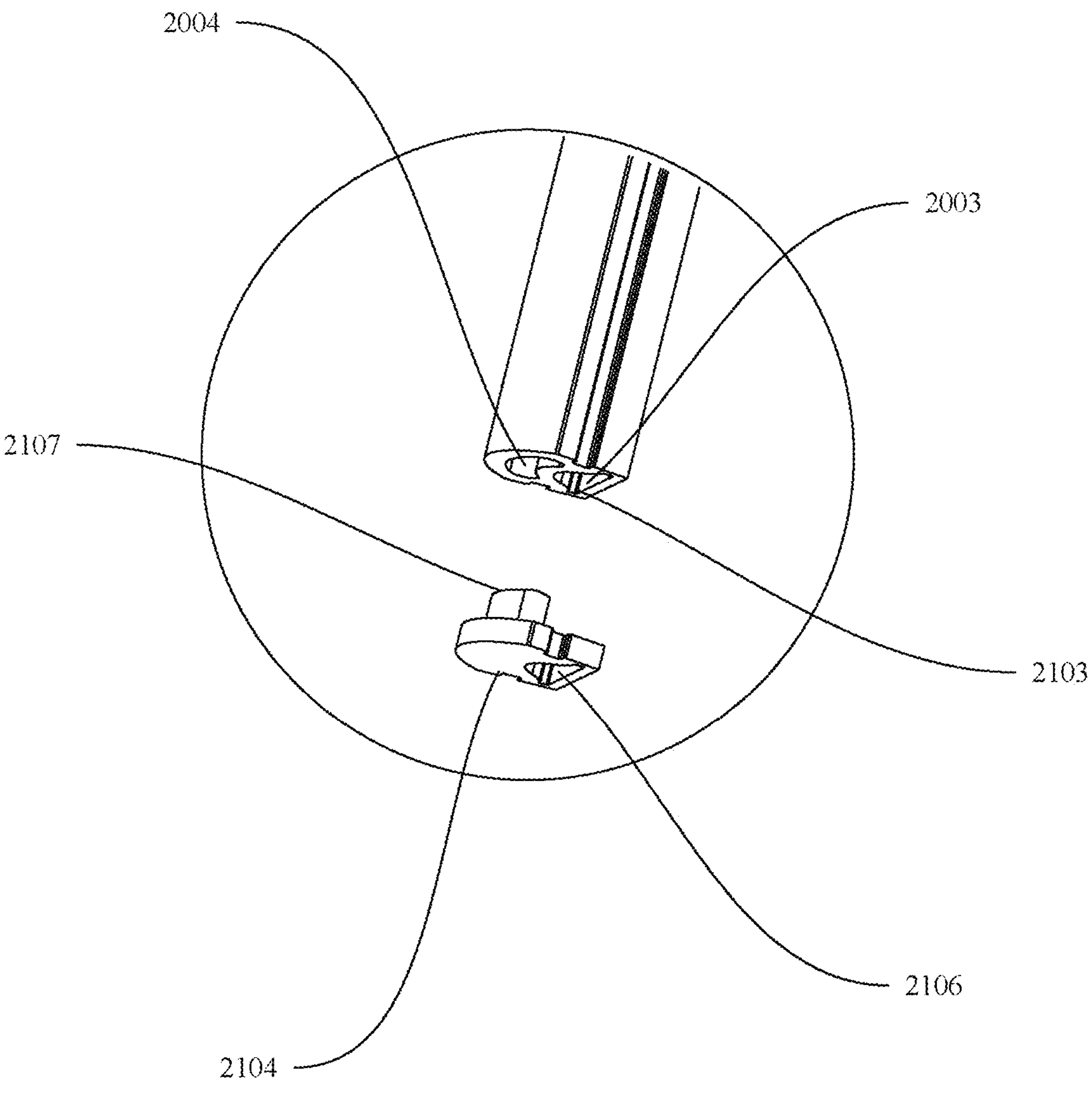
FIG. 8 is an enlarged structural diagram of an area D in FIG. 6.
Figure 9:
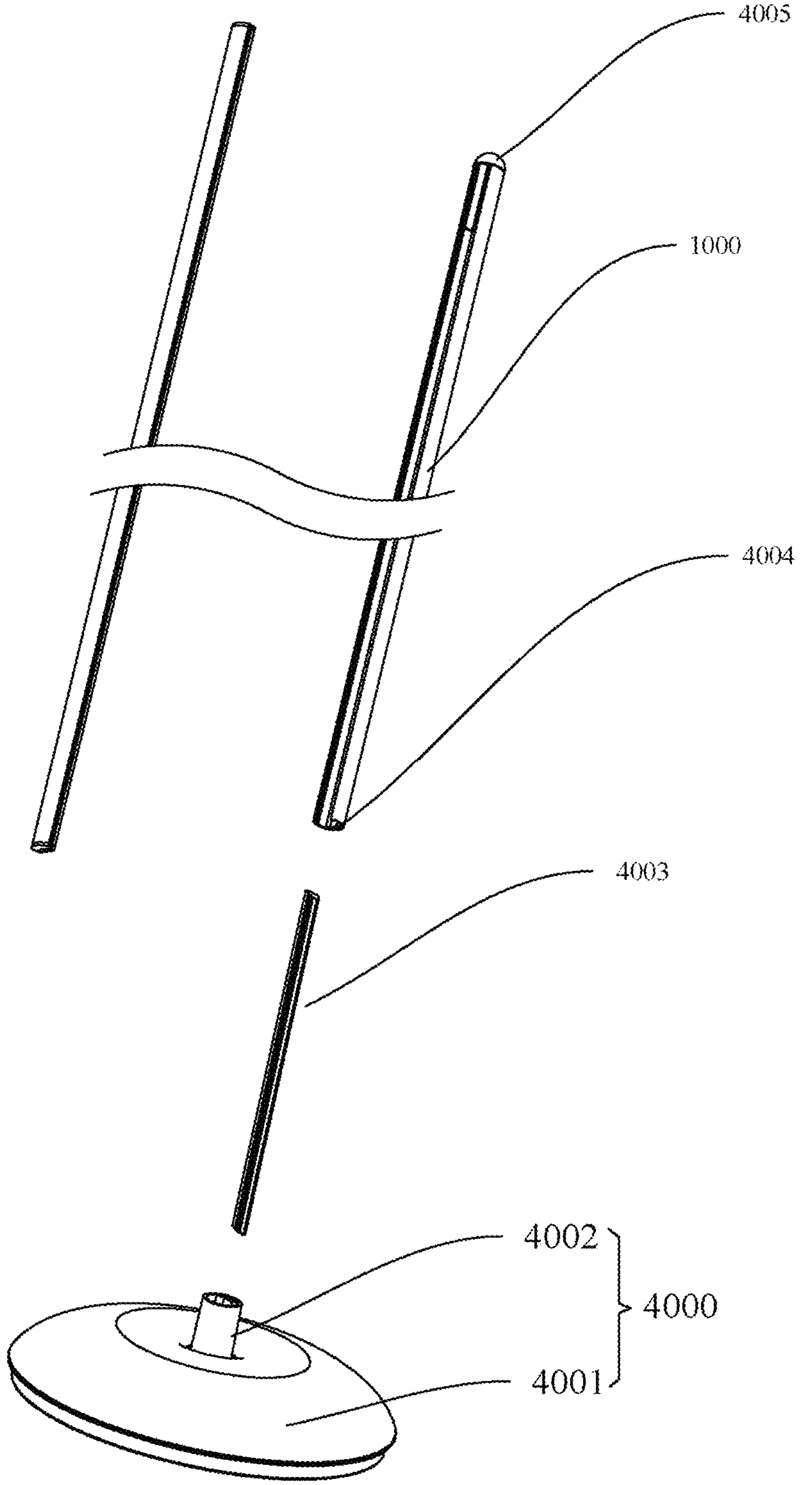
FIG. 9 is an exploded structural schematic diagram of a connection of a base and the supporting member.
Figure 10:
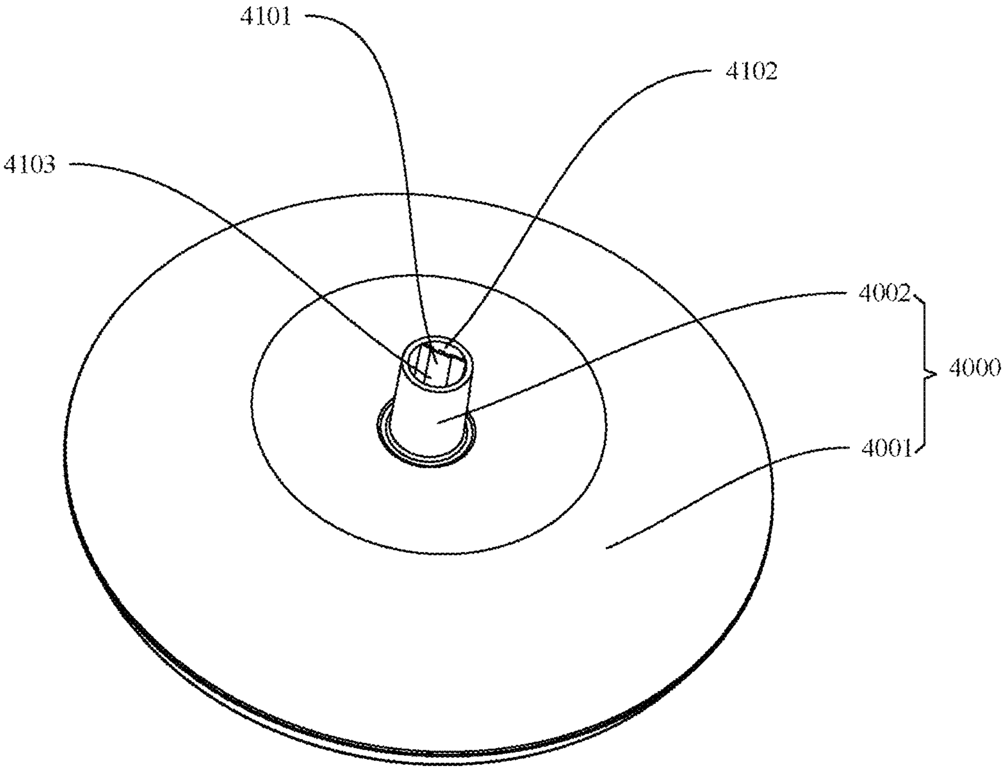
FIG. 10 is a schematic structural diagram of the base.

Referring to FIG. 1 to FIG. 10, the present invention discloses a modular floor lamp 100, including a supporting member 1000 and a flexible light-emitting device 2000 detachably connected to the supporting member 1000. The flexible light-emitting device 2000 includes a light-transmitting lamp body 2001 and a light-emitting element 2002. The lamp body 2001 is provided with at least one installation cavity 2003, and the light-emitting element 2002 is arranged within the installation cavity 2003 in a detachable manner. The lamp body 2001 is also provided with at least one cavity 2004, the cavity 2004 is arranged parallel to the installation cavity 2003, and a light from the light-emitting element 2002 enters the cavity 2004 and is refracted and mixed. The supporting member 1000 and the flexible light-emitting device 2000 are detachably connected, allowing users to freely combine and detach them as needed, enhancing the flexibility and convenience of use and adapting to the requirements of different scenarios and environments. In addition, the light of the light-emitting element 2002 is refracted and mixed through the cavity 2004, providing a more uniform and soft lighting effect, which can effectively reduce light spots and shadows, improving the quality of the light and visual comfort. Moreover, the cavity 2004 in the lamp body 2001 can reduce the weight of the lamp body 2001, preventing the lamp body 2001 from falling off the supporting member 1000.

In this embodiment, the supporting member 1000 includes at least one first supporting member 1001 and at least one second supporting member 1002, the first supporting member 1001 and the second supporting member 1002 are detachably connected through a first insertion column 3000.

Specifically, both the first supporting member 1001 and the second supporting member 1002 have a hollow cylindrical structure, and the first supporting member 1001 and the second supporting member 1002 are equipped with a first partition plate 1003 respectively. The first partition plate 1003 divides an internal space of the first supporting member 1001 and the second supporting member 1002 into a first accommodating space 1004 and a second accommodating space 1005 respectively. The lamp body 2001 is installed within the first accommodating space 1004 in a detachable manner, and an outer side wall of the lamp body 2001 abuts against an inner side wall of the first accommodating space 1004. Each of two ends of the second accommodating space 1005 is provided with a first insertion hole 1101, and the first insertion column 3000 is inserted into the first insertion hole 1101, thus the first supporting member 1001 and the second supporting member 1002 are detachably connected.

In this embodiment, the first supporting member 1001 and the second supporting member 1002 are detachably connected through the first insertion column 3000, enabling users to conveniently detach and assemble them as needed. Whether it is installation, movement, or storage, it is more flexible and convenient. Moreover, by arranging the first partition plate 1003, the internal accommodating space of the first supporting member 1001 and the second supporting member 1002 is fully utilized, making the overall structure of the floor lamp more compact.

In this embodiment, each of two ends of the first partition plate is provided with two fixing holes 1102 respectively, a fastener is arranged within the fixing hole 1102, and when the first insertion column 3000 is inserted into the first insertion hole 1101, the fastener abuts against the first insertion column 3000, thus the first insertion column 3000 is fixed within the first insertion hole 1101. Moreover, the fastener can be any one or more of screws, bolts, etc. By arranging the fixing hole 1102 and the fixing member, the accidental detachment or loosening of the first insertion column 3000 during the insertion process is effectively prevented, enhancing the connection stability of the overall structure.

In this embodiment, one side of the first partition plate 1003 facing the second accommodating space 1005 is provided with a first groove 1103 and a second groove 1104, and one side of the first insertion column 3000 is provided with a first raised strip 3001 and a second raised strip 3002. When the first insertion column 3000 of the first supporting member 1001 is inserted into the first insertion hole 1101 of the second supporting member 1002, the first raised strip 3001 is clamped into the first groove 1103, and the second raised strip 3002 is clamped into the second groove 1104. By arranging the first groove 1103 and the second groove 1104, as well as the first raised strip 3001 and the second raised strip 3002, when the first insertion column 3000 of the first supporting member 1001 is inserted into the first insertion hole 1101 of the second supporting member 1002, the raised strips and the grooves are clamped with each other, effectively ensuring the stable connection between the first supporting member 1001 and the second supporting member 1002 and avoiding the situations of loosening or detachment during the use process.

In this embodiment, the first supporting member 1001 and the second supporting member 1002 are respectively provided with an installation opening 1006, and the installation opening 1006 is communicated with the first accommodating space 1004, thus the lamp body 2001 is installed within the first accommodating space 1004 in a detachable manner through the installation opening 1006.

Specifically, each of two side walls of the first accommodating space 1004 is provided with an installation clamping strip 1007 respectively, each of two side walls of the lamp body 2001 is provided with an installation clamping groove 2005 corresponding to the installation clamping strip 1007, and the installation clamping strip 1007 is clamped into the installation clamping groove 2005, thus the lamp body 2001 is detachably connected with the first accommodating space 1004. The installation clamping strip 1007 is clamped into the installation clamping groove 2005 positioned on the lamp body 2001, making the installation and detachment of the lamp body 2001 more convenient and efficient. Moreover, the clamping connection between the installation clamping strip 1007 and the installation clamping groove 2005 provides a stable connection, ensuring that the lamp body 2001 is firmly fixed within the first accommodating space 1004 after installation, not prone to loosening or falling off, and enhancing the stability and reliability of the overall structure.

In this embodiment, the lamp body 2001 is a flexible light-transmitting hose, the light-emitting element 2002 includes a flexible light panel and a plurality of light beads electrically connected to the flexible light panel, and the light-emitting element 2002 is able to be bent at any angle along with the lamp body 2001. The flexible light-transmitting hose can reduce the damage and wear caused by the fixed shape during the use of the lamp, thereby prolonging the service life of the lamp and ensuring the stability and durability during long-term use.

In this embodiment, each of two ends of the lamp body 2001 is provided with an opening 2103 respectively, and the opening 2103 is communicated with the cavity 2004, thus the light-emitting element 2002 can be easily installed and detached through these openings 2103. When it is necessary to replace or maintain the light-emitting element 2002, users can quickly complete the operation through the opening 2103 without having to disassemble the entire device, which improves the convenience of use.

In this embodiment, each of two ends of the lamp body 2001 is provided with a first sealing cover 2104 and a second sealing cover 2105 respectively for sealing the opening 2103. The first sealing cover 2104 and the second sealing cover 2105 can effectively seal the opening 2103 at each of two ends of the lamp body 2001, prevent dust and debris from entering the interior of the lamp body 2001, thus protecting the light-emitting element 2002 and the internal structure and prolonging the service life of the device. The first sealing cover 2104 is provided with a through hole 2106, and the through hole 2106 is communicated with the installation cavity 2003, thus the light-emitting element 2002 is installed within the installation cavity 2003 in a detachable manner and extends outward from the through hole 2106 to be electrically connected with an external power source.

In this embodiment, the first sealing cover 2104 and the second sealing cover 2105 are respectively provided with a sealing column 2107, and the sealing column 2107 is installed within the cavity 2004 to seal the cavity 2004, prevent dust, moisture and other debris from entering the interior of the lamp body 2001, avoid the influence of the external environment on the light-emitting element 2002 and the internal circuit, reduce electrical failures and safety hazards caused by external factors, and enhance the safety of use.

In this embodiment, a thickness of an outer side wall of the installation cavity ranges from 0.1 mm to 100 mm, a thickness of the outer side wall of the cavity ranges from 0.2 mm to 120 mm. The cavity 2004 has a relatively large accommodating space, enabling light to be fully refracted and mixed within the cavity 2004, thus providing a more uniform and soft lighting effect. Moreover, since an outer side wall of the cavity 2004 has an arc-shaped structure, it can make the light have a multi-angle divergence effect.

In another embodiment of the present invention, the floor lamp 100 also includes a base 4000, the base 4000 is detachably connected with the supporting member 1000, and the flexible light-emitting device 2000 is detachably connected to the supporting member 1000 and is electrically communicated with the base 4000. The detachable connection between the base 4000 and the supporting member 1000 enables users to conveniently install and detach the floor lamp.

In this embodiment, the base 4000 includes an installation bottom plate 4001, a central connecting column 4002 is arranged on the installation bottom plate 4001, and the central connecting column 4002 is detachably connected with the supporting member 1000 through a second insertion column 4003. Specifically, each of two ends of the supporting member 1000 is provided with a second insertion hole 4004 respectively, and the second insertion column 4003 is inserted into the second insertion hole 4004 positioned at a bottom end of the support member 1000, thus the base 4000 and the supporting member 1000 are detachably connected. The connection between the central connecting column 4002 and the supporting member 1000 through the second insertion column 4003 makes the connection between the base 4000 and the supporting member 1000 more stable, prevents loosening or falling off during the use process, and enhances the stability and reliability of the overall structure.

In this embodiment, the central connecting column 4002 has a hollow cylindrical structure, a second partition plate 4101 is arranged within the central connecting column 4002, the second partition plate 4101 divides an internal space of the central connecting column 4002 into a third accommodating space 4102 and a fourth accommodating space 4103 respectively, and the second insertion column 4003 abuts against an inner side wall of the third accommodating space 4102. The flexible light-emitting element 2000 is installed within the supporting member 1000 in a detachable manner and extends toward an interior of the fourth accommodating space 4103, and electrically connected with the base 4000. The design of the hollow cylindrical structure and the second partition plate 4101 enables the internal space to be fully utilized. The third accommodating space 4102 and the fourth accommodating space 4103 can accommodate different components respectively, optimize the internal layout, reduce space waste, and enhance the compactness and functionality of the device.

In this embodiment, a cover plate 4005 for sealing the supporting member 1000 is arranged on a top end of the supporting member 1000. It can effectively seal the supporting member 1000, prevent dust, moisture and other impurities from entering the interior of the supporting member 1000, thus protecting the internal components, prolonging the service life of the device, and also improving the appearance of the device.

As described above, one or more embodiments are provided in conjunction with the detailed description, The specific implementation of the present invention is not confirmed to be limited to that the description is similar to or similar to the method, the structure and the like of the present invention, or a plurality of technical deductions or substitutions are made on the premise of the conception of the present invention to be regarded as the protection of the present invention.

What is claimed is:

1. A modular floor lamp, comprising:

a supporting member; and a flexible light-emitting device detachably connected to the supporting member, wherein the flexible light-emitting device comprises a light-transmitting lamp body and a light-emitting element; the lamp body is provided with at least one installation cavity, and the light-emitting element is arranged within the installation cavity in a detachable manner; the lamp body is also provided with at least one cavity, the cavity is arranged parallel to the installation cavity, and a light from the light-emitting element enters the cavity and is refracted and mixed within the cavity;

wherein the supporting member comprises at least one first supporting member and at least one second supporting member, the first supporting member and the second supporting member are detachably connected through a first insertion column.

2. The modular floor lamp according to claim 1, wherein both the first supporting member and the second supporting member have a hollow cylindrical structure, the first supporting member and the second supporting member are equipped with a first partition plate respectively, the first partition plate divides an internal space of the first supporting member and the second supporting member into a first accommodating space and a second accommodating space respectively, the lamp body is installed within the first accommodating space in a detachable manner, and an outer side wall of the lamp body abuts against an inner side wall of the first accommodating space.

3. The modular floor lamp according to claim 2, wherein each of two ends of the second accommodating space is provided with a first insertion hole, and the first insertion column is inserted into the first insertion hole, thus the first supporting member and the second supporting member are detachably connected.

4. The modular floor lamp according to claim 3, wherein each of two ends of the first partition plate is provided with at least one fixing hole respectively, a fastener is arranged within the fixing hole, and when the first insertion column is inserted into the first insertion hole, the fastener abuts against the first insertion column, thus the first insertion column is fixed within the first insertion hole.

5. The modular floor lamp according to claim 4, wherein one side of the first partition plate facing the second accommodating space is provided with a first groove and a second groove, one side of the first insertion column is provided with a first raised strip and a second raised strip, when the first insertion column of the first supporting member is inserted into the first insertion hole of the second supporting member, the first raised strip is clamped into the first groove, and the second raised strip is clamped into the second groove.

6. The modular floor lamp according to claim 4, wherein the first supporting member and the second supporting member are respectively provided with an installation opening, and the installation opening is communicated with the first accommodating space, thus the lamp body is installed within the first accommodating space in a detachable manner through the installation opening.

7. The modular floor lamp according to claim 6, wherein each of two side walls of the first accommodating space is provided with an installation clamping strip respectively, each of two side walls of the lamp body is provided with an installation clamping groove corresponding to the installation clamping strip, and the installation clamping strip is clamped into the installation clamping groove, thus the lamp body is detachably connected with the first accommodating space.

8. A modular floor lamp, comprising:

a supporting member; and a flexible light-emitting device detachably connected to the supporting member, wherein the flexible light-emitting device comprises a light-transmitting lamp body and a light-emitting element; the lamp body is provided with at least one installation cavity, and the light-emitting element is arranged within the installation cavity in a detachable manner; the lamp body is also provided with at least one cavity, the cavity is arranged parallel to the installation cavity, and a light from the light-emitting element enters the cavity and is refracted and mixed within the cavity;

wherein the lamp body is a flexible light-transmitting hose, the light-emitting element comprises a flexible light panel and a plurality of light beads electrically connected to the flexible light panel, and the light-emitting element is able to be bent at any angle along with the lamp body.

9. The modular floor lamp according to claim 1, wherein each of two ends of the lamp body is provided with an opening respectively, and the opening is communicated with the cavity, thus the light-emitting element is installed within the installation cavity in a detachable manner through the opening.

10. The modular floor lamp according to claim 9, wherein each of two ends of the lamp body is provided with a first sealing cover and a second sealing cover respectively for sealing the opening, the first sealing cover is provided with a through hole, and the through hole is communicated with the installation cavity, thus the light-emitting element is installed within the installation cavity in a detachable manner and extends outward from the through hole to be electrically connected with an external power source.

11. The modular floor lamp according to claim 10, wherein the first sealing cover and the second sealing cover are respectively provided with a sealing column, and the sealing column is installed within the cavity to seal the cavity.

12. The modular floor lamp according to claim 11, wherein the cavity is positioned on an outer side of the installation cavity, and an outer side wall of the cavity has an arc-shaped structure, thus a light of the light-emitting element is refracted and mixed within the cavity and then diverges outward.

13. The modular floor lamp according to claim 12, wherein a thickness of an outer side wall of the installation cavity ranges from 0.1 mm to 100 mm, a thickness of the outer side wall of the cavity ranges from 0.2 mm to 120 mm, and an accommodating space volume of the cavity is greater than an accommodating space volume of the installation cavity, thus the light is able to be fully refracted and mixed within the cavity.

14. A modular floor lamp, comprising:

a supporting member; and a flexible light-emitting device detachably connected to the supporting member, wherein the flexible light-emitting device comprises a light-transmitting lamp body and a light-emitting element; the lamp body is provided with at least one installation cavity, and the light-emitting element is arranged within the installation cavity in a detachable manner; the lamp body is also provided with at least one cavity, the cavity is arranged parallel to the installation cavity, and a light from the light-emitting element enters the cavity and is refracted and mixed within the cavity;

wherein the floor lamp also comprises a base, the base is detachably connected with the supporting member, and the flexible light-emitting device is detachably connected to the supporting member and is electrically communicated with the base.

15. The modular floor lamp according to claim 14, wherein the base comprises an installation bottom plate, a central connecting column is arranged on the installation bottom plate, and the central connecting column is detachably connected with the supporting member through a second insertion column.

16. The modular floor lamp according to claim 15, wherein each of two ends of the supporting member is provided with a second insertion hole, and the second insertion column is inserted into the second insertion hole respectively, thus the base and the supporting member are detachably connected.

17. The modular floor lamp according to claim 16, wherein the central connecting column has a hollow cylindrical structure, a second partition plate is arranged within the central connecting column, the second partition plate divides an internal space of the central connecting column into a third accommodating space and a fourth accommodating space respectively, and the second insertion column abuts against an inner side wall of the third accommodating space.

18. The modular floor lamp according to claim 17, wherein the light-emitting element is installed within the supporting member in a detachable manner and extends toward an interior of the fourth accommodating space, and electrically connected with the base.

19. The modular floor lamp according to claim 18, wherein a cover plate for sealing the supporting member is arranged on a top end of the supporting member.

* * * * *